United States Patent [19]

Fatahalian et al.

[11] Patent Number: 5,029,077
[45] Date of Patent: Jul. 2, 1991

[54] SYSTEM AND METHOD FOR CONTROLLING PHYSICAL RESOURCES ALLOCATED TO A VIRTUAL TERMINAL

[75] Inventors: Farhad H. Fatahalian, Round Rock; Larry A. Halliday; Khoa D. Nguyen, both of Austin, all of Tex.

[73] Assignee: International Business Machines Corporation, Armonk, N.Y.

[21] Appl. No.: 241,757

[22] Filed: Sep. 7, 1988

Related U.S. Application Data

[63] Continuation of Ser. No. 820,453, Jan. 17, 1986, abandoned.

[51] Int. Cl.$^5$ .......................... G06F 3/00; G06F 9/00; G06F 13/00
[52] U.S. Cl. ................................ 364/200; 364/228.2; 364/237.2; 364/239; 364/280; 364/280.9; 364/282.2; 364/284.2; 364/927.2; 364/927.99; 364/939; 364/976; 364/975.4; 364/521
[58] Field of Search ... 364/200 MS File, 900 MS File, 364/521

[56] References Cited

U.S. PATENT DOCUMENTS

| | | | |
|---|---|---|---|
| 3,539,999 | 8/1967 | Houldin | 340/172.5 |
| 3,559,207 | 1/1971 | Atkinson | 340/324 |
| 3,823,389 | 7/1974 | Heitman et al. | 364/900 |
| 3,967,268 | 6/1976 | Roberts | 340/324 |
| 4,070,710 | 1/1978 | Sukonick | 364/900 |
| 4,107,784 | 8/1978 | Van Bemmelen | 364/200 |
| 4,161,777 | 7/1979 | Ying | 364/200 |
| 4,197,590 | 4/1980 | Sukonick | 364/900 |
| 4,231,087 | 10/1980 | Hunsberger et al. | 364/200 |
| 4,338,599 | 7/1982 | Leininger | 340/721 |
| 4,458,331 | 7/1984 | Amezcua et al. | 364/900 |
| 4,527,236 | 7/1985 | Ermolovich | 364/200 |
| 4,533,996 | 8/1985 | Hartung et al. | 364/200 |
| 4,555,775 | 11/1985 | Pike | 364/900 |
| 4,586,134 | 4/1986 | Norstedt | 364/200 |
| 4,586,158 | 4/1986 | Brandle | 364/900 |
| 4,622,013 | 11/1986 | Cerchio | 434/118 |
| 4,641,274 | 2/1987 | Swank | 364/900 |
| 4,646,235 | 2/1987 | Hirosawa et al. | 364/200 |
| 4,713,779 | 12/1987 | Graciotti et al. | 364/521 |
| 4,727,480 | 2/1988 | Albright et al. | 364/200 |
| 4,823,108 | 4/1989 | Pope | 340/721 |

OTHER PUBLICATIONS

Stein, A. J., Virtual Terminal Protocols, IBM, TDB, vol. 19, No. 12, May 1977, pp. 4834-4837.
Clarke, D. C., and Sih, P.M., Method for Correlating Graphical Data on an Interactive Display, IBM TDB, vol. 21, No. 11, Apr. 1979, pp. 4658-4659.

Primary Examiner—Thomas C. Lee
Assistant Examiner—Ayni Mohamed
Attorney, Agent, or Firm—Marilyn D. Smith; Mark E. McBurney

[57] ABSTRACT

A data processing system gives an application running on the operating system direct access to the output display. The system is operable in two modes. In the first mode, if the application displays text to the output display, the output data must go through every layer of the processing system before it reaches the output display. In the second mode, the application can output data directly to the output display without going through the many layers of the processing system. In this second mode, a buffer is defined by the application. Input data from the input devices are stored in this buffer. The application accesses the buffer for direct output to the display.

21 Claims, 9 Drawing Sheets

SYSTEM AND METHOD FOR CONTROLLING PHYSICAL RESOURCES ALLOCATED TO A VIRTUAL TERMINAL

This is a continuation of application Ser. No. 820,453 filed Jan. 17, 1986 now abandoned.

CROSS-REFERENCES TO RELATED APPLICATIONS

Co-pending application Ser. No. 820,451, filed Jan. 17, 1986 for a VIRTUAL TERMINAL SUBSYSTEM and assigned to the same assignee as the present invention.

BACKGROUND OF THE INVENTION

1. Field of the Invention

This invention relates to data processing systems and more particularly to the control of the display hardware of a data processing system.

2. Description of the Related Art

A typical data processing system is made up of layers. One of the layers is an operating system such as an UNIX* operating system, although it could be any other operating system, also. The next layer is called a virtual machine interface which is a logical layer. All of the commands of the operating system that go to devices must go through this virtual machine interface. Below the virtual machine interface layer is a subsystem called a virtual terminal subsystem. The virtual terminal subsystem is responsible for managing all of the hardware devices such as the keyboard, locator, tablet, sound device, and all of the displays, whether in character (alphanumeric) mode or all points addressable (APA) mode.

* UNIX is a trademark of AT&T Bell Laboratories.

Generally, alphanumeric displays can only display text characters. However, in all points addressable mode, characters and graphics are supported. For data processing systems that support graphics, the costs are higher than if just text processing is supported.

The following describes the general flow through these layers when a command is sent from an application program through a system to produce output on a display. In order to send a command to display either graphics or characters on the display, the operating system causes a command to go through the virtual machine interface. While in the virtual machine interface layer the command is captured and reformatted into queue elements. From there the command is sent to the virtual terminal subsystem. The virtual terminal subsystem intercepts the command and determines the type of command. Next, the virtual terminal subsystem sends the command to the display.

Since the command to display has to go through all of these layers prior to reaching the display, the system performance is degraded. By going through these layers, the response time of the system is lowered. For example, if an application program utilizes a mouse for cursor movement on the display screen, there may be a significant delay between the mouse movement and the cursor repositioning on the screen of the output display device. Ideally, these two movements should be essentially simultaneous.

SUMMARY OF THE INVENTION

It is an object of this invention to improve the response time between a command to display in an application program and the output of the hardware devices in a data processing system environment.

In the data processing system of this invention, the virtual terminal subsystem operates in two modes. One mode is called a keyboard/send receive (KSR) mode, and the other mode is called the mode. The KSR mode is used primarily for displaying text on the display. The commands going to a virtual terminal in KSR mode, originate from the application program and go through every layer of the system in order to get to the display.

Monitor mode is designed to give application programs, especially graphic applications, running on the operating system a direct output path to the display hardware, and a shortened input path for input devices. The virtual terminal subsystem is circumvented in this mode. In this way performance is increased since the layering is removed between the application program and the hardware in the system of this invention.

In monitor mode, a buffer is defined for storing the input data from the input device. The application program accesses this buffer at any time and without knowledge from the virtual terminal subsystem. The application then takes this data and directly outputs the data to the output display.

DESCRIPTION OF THE PREFERRED EMBODIMENT

Figure 1:
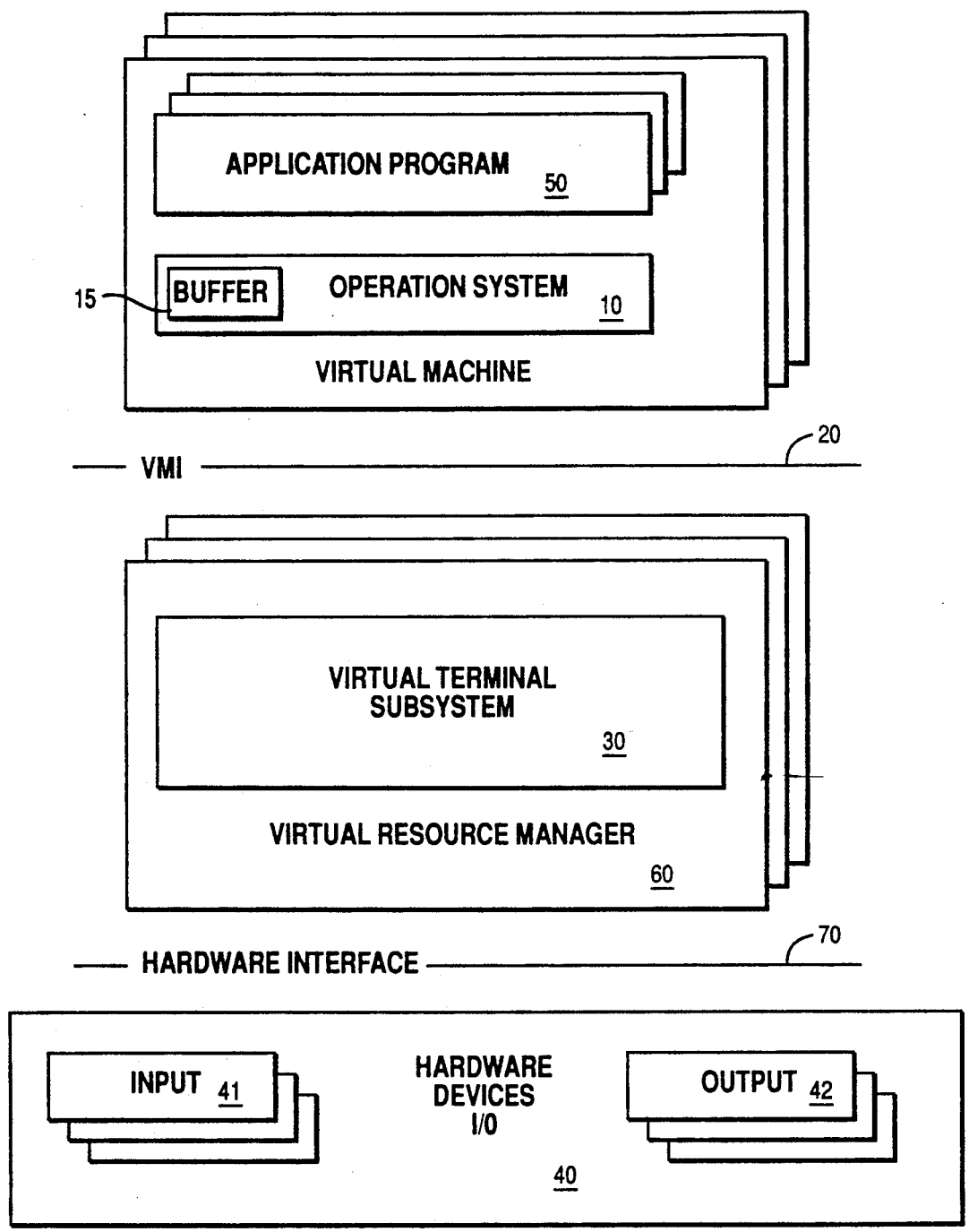
FIG. 1 shows the layers in a data processing system.

In FIG. 1, the various layers in a data processing system environment are shown as the application program 50 which runs on the operating system 10, the virtual machine interface (VMI) layer 20 which is a logical layer, and the virtual terminal subsystem 30 which manages all of the hardware devices 40. The hardware devices 40 may be any number of, and any combination of, but not limited to, the following input 41 and output 42 devices: a keyboard 41, a mouse 41, a tablet 41, a sound device 42 and displays 42. The displays 42 may also be virtual displays that are shared among the virtual terminal.

The virtual resource manger 60 manages all of the input/output devices 40. The virtual terminal subsystem 30 is part of the virtual resource manager 60. This processing system virtualizes the use of the resources, such that the entire resource is given to an application for a user's activity. This is carried out in the virtual terminal subsystem 30. The virtual terminal subsystem provides terminal support for the virtual machine environment.

In the data processing system of this invention, the virtual terminal subsystem operates in two modes. One mode is called a KSR mode, and the other mode is called the monitor mode. The KSR mode is used primarily for displaying text on the display. It is an ANSI type interface handling ASCII codes. No graphics can be done through the KSR mode. It is only used for displaying characters. Additionally, it is a very slow interface since the commands going to a KSR virtual terminal originate from the application program, and go through every layer of the system in order to get to the display. As a result, performance in this mode is degraded.

The second mode is called monitor mode. The monitor mode supports applications which interact directly with the hardware refresh buffer of the displays, whether it is in character or all point addressable (APA) arrangement, and bypasses the virtual terminal subsystem for output to the display device.

In monitor mode the input devices 41 have their inputs routed through the virtual terminal subsystem 30 to the application program 50. The applications using the monitor mode have an option of defining a circular buffer 15 in the operating system's 10 memory space. The virtual terminal subsystem receives an interrupt from the input devices and deposits the data directly into the input buffer 15. The virtual terminal subsystem does not generate an interrupt to the application program unless it is the first time the data is deposited into the circular buffer 15.

If the application program does not choose to define a circular buffer 15, the virtual terminal subsystem 30 gets an interrupt from the input devices 41 and uses an interrupt path to send the data by. The interrupt path requires queueing interface management which involves communications between the various layers of the communication system such as the operating system 10, the virtual machine interface 20, and the virtual terminal subsystem 30. The application program thereby is subject to the two to three layers of queuing in the operating system 10, and the virtual terminal subsystem 30.

Therefor, if the application program 50 defines the circular buffer 15, queuing overhead is eliminated. In this way, if the application program 50 is trying to track the input from a keyboard, mouse, or a tablet, the application program 50 can track it much faster. As a result, the input data will be echoed to the display at a faster rate.

In the data processing system of this invention, the key element with respect to handling inputs from input devices lies in the ability for the application program to define a circular buffer which is managed by the application program and the virtual terminal subsystem.

The structure of the circular buffer is as follows. It requires a status area which is located in the first 32 bytes of the buffer. The status area contains an offset pointer for the virtual terminal subsystem and an offset pointer for the operating system. The offset pointers are used to put data into the buffer and to remove data from the buffer.

The size of the buffer ring 15 is variable. Preferably it should be at least 34 bytes and preferably no larger than 64,000 bytes. The buffer ring is defined after the system goes into the monitor mode which will be discussed later.

The discussion above has defined the input path, i.e. how the input devices get routed to the operating system. In summary, the data from the input devices, such as when a locator is moved on a display screen, goes to the virtual terminal subsystem. The virtual terminal subsystem deposits the data into the buffer ring. Once the data is in the buffer ring, the application program can remove the data from the buffer ring at any time.

For the output path, the virtual terminal subsystem is isolated. The virtual terminal subsystem has no knowledge of what the application program is doing. With the virtual terminal subsystem out of the communication path, system performance is enhanced since many communication layers in the virtual resource manager are avoided. The virtual resource manager, which contains the virtual terminal subsystem, is bounded by the layer above called the virtual machine interface, and the hardware devices.

During monitor mode, when the application 50 is drawing a picture on a display 42, the data is sent directly from the application 50 to the display 42. The virtual terminal subsystem has no knowledge of this direct data transfer.

Figure 2:
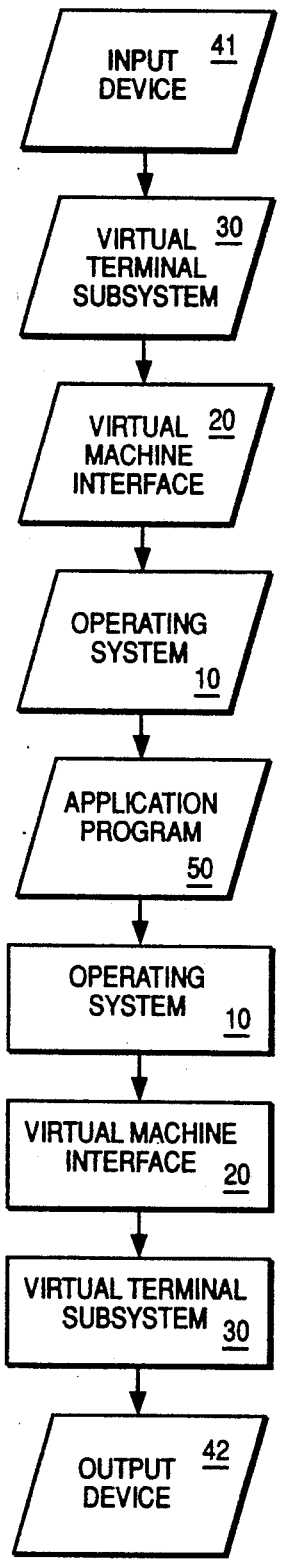
FIG. 2 shows the path a command to display takes in KSR mode.

The differences between the KSR and monitor modes as discussed above is best illustrated in FIGS. 2 and 3. FIG. 2 shows the path a command to display takes in KSR mode. First the data is received from an input device 41 and sent to the operating system 10 via the virtual terminal subsystem 30 and virtual machine interface 20. The application 50 accesses the input data from the operating system 10, and determines the corresponding output. Then the operating system 10 generates a command to display and sends it to the virtual machine interface 20. The command to display goes through the virtual terminal subsystem 30 to the output device 42.

Figure 3:
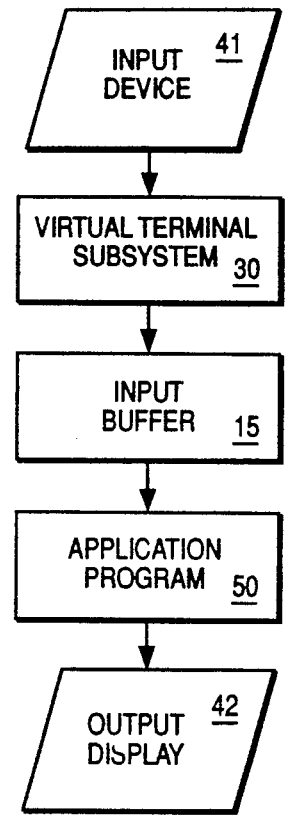
FIG. 3 shows the path a command to display takes in monitor mode.

In contrast, FIG. 3 shows the path a command to display takes in monitor mode. The virtual terminal subsystem 30 receives the data from the input device 41 and deposits that data into an input buffer 15. Once the data is in the input data 15, the application 50 can access that data at any time, and without the knowledge of the virtual terminal subsystem that it is doing so. From there, the application 50 sends the data from the input buffer 15 directly to the output display 42.

In monitor mode the virtual terminal subsystem is bypassed, and has no knowledge of the activity between the application and the output device. Therefore, the applications using this mode must maintain their own data presentation space, participate, and facilitate transitions among virtual terminals.

Applications using monitor mode are also responsible for all input data tracking (keyboard, mouse, tablet, lighted program function keys, and dials). The applications can specify the format protocol of keyboard input data that can best suit its processing requirements. The protocol modes may be set to cause keystroke data to be converted into ASCII characters, control sequences, or to be returned as key positions, status, and scan codes. Applications are also responsible for echoing the keyboard and locator inputs.

In general, monitor mode will give the application the flexibility of controlling the display hardware, optimizing the movement of data between the virtual terminal subsystem and the application, and improving the performance of the system significantly by removing several layers of software between the application and the display device.

DESCRIPTION OF OPERATION

FIGS. 4-9 illustrate the application's operation of the KSR mode and the monitor mode. Although, any operating system may be utilized, the operation is described in reference to a UNIX operating system.

Figure 4:
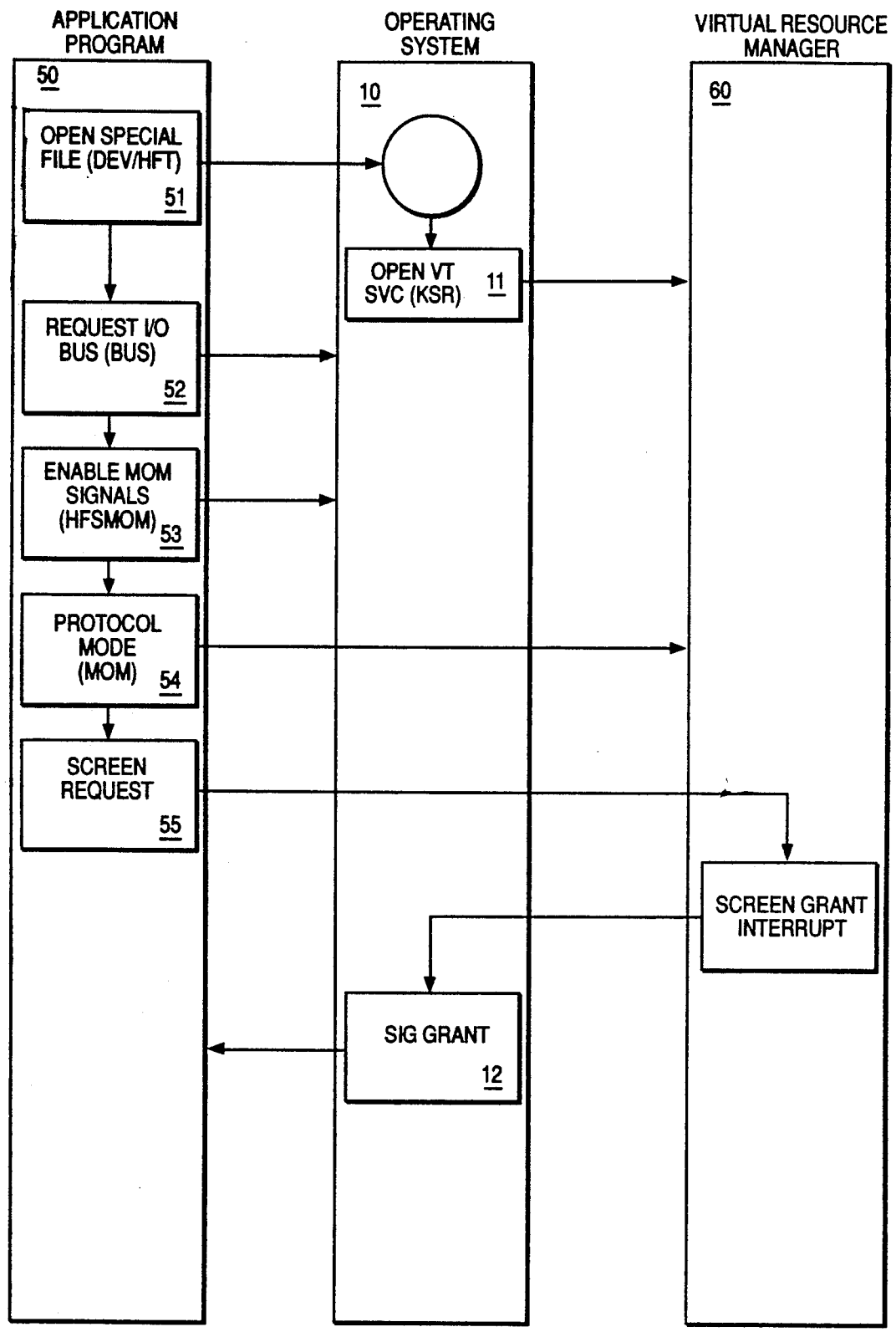
FIG. 4 is a flow chart of the sequential events when a new terminal is opened in monitor mode.

FIG. 4 illustrates the steps needed for an application 50 to open a new virtual terminal in monitor mode. The communication between the application 50, the operating system 10, and the virtual resource manager 60 during these steps are also illustrated.

The first activity an application 50 has to do is open a special file which is shown as step 51. The special file is DEV/HFT. This step causes a UNIX HFT driver to send a open virtual terminal SVC command 11 to the virtual resource manager 60. This causes a virtual terminal to be opened in KSR mode. If the application chooses to run in monitor mode, it must access the I/O bus. Thus, step 52 requests the bus using the BUS command. Next, the application 50 must enable the monitor mode (MOM) signals, step 53, which are received from the virtual terminal subsystems. Then, step 54, the PROTOCOL MODE command from the application 50 to the virtual terminal subsystem 30 in the virtual resources manager 60 changes the mode from KSR to monitor mode. Step 55 is a screen request command that is sent from the application 50 to the virtual terminal subsystem 30 to define the monitor mode input buffer, and gives the application the ownership of the display.

This screen request command 55 and the previous protocol command 54 puts the terminal into monitor mode, and also gives the application the opportunity to either define or not define a buffer ring. Whether or not the buffer ring is defined, the screen request, step 55, must be sent out to the virtual terminal 30. At this point the virtual terminal is in monitor mode, and the application 50 will receive a signal grant 12 from the virtual terminal subsystem. This tells the application that the application has complete control of the display adapter that is attached to the virtual terminal. From this point on, the application can display whatever it chooses on the display of the virtual terminal.

Figure 5:
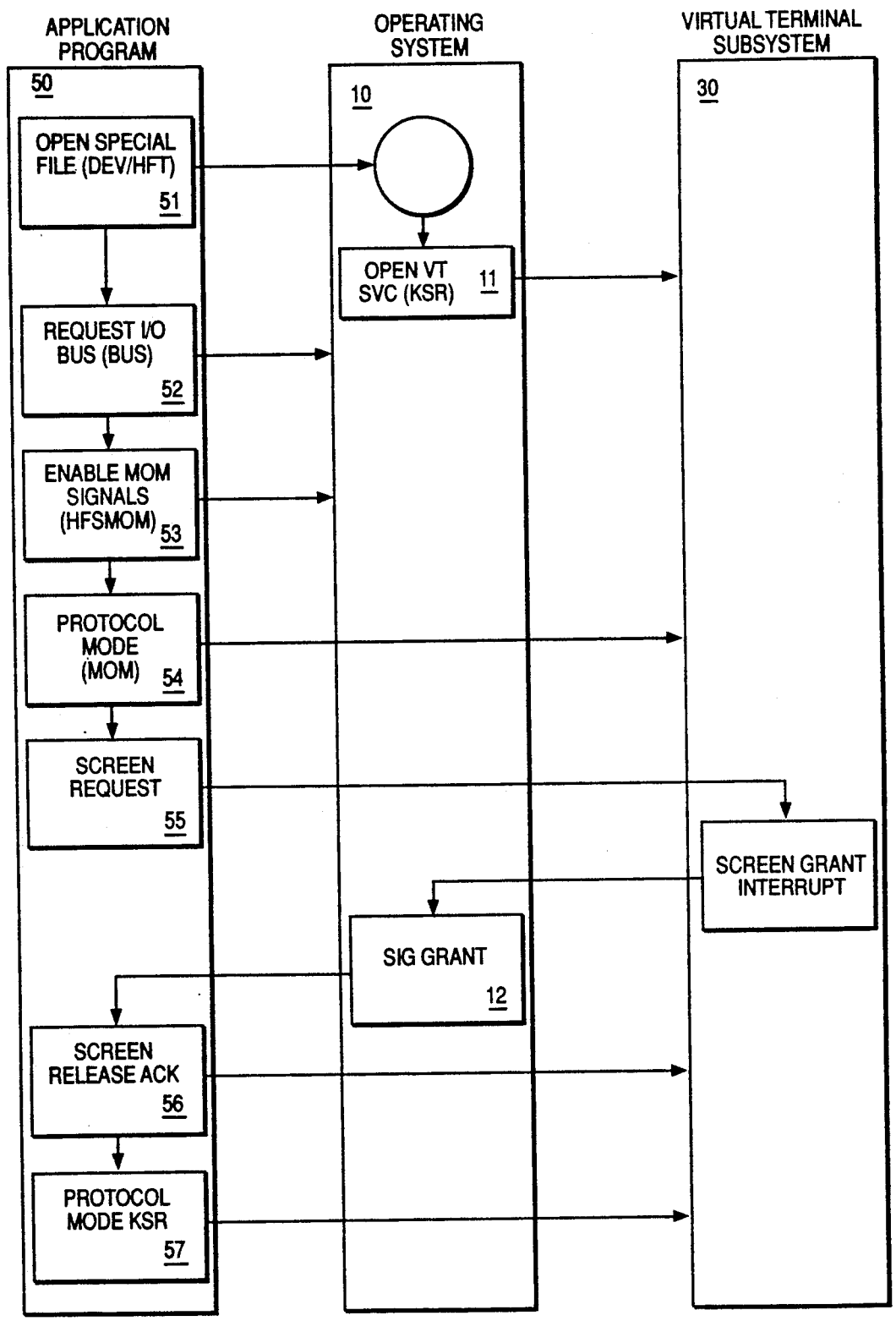
FIG. 5 is a flow chart of the sequential events when a new terminal is opened in monitor mode and then changed to KSR mode on the same terminal.

FIG. 5 illustrates the steps in opening a new terminal in monitor mode and then changing back to KSR mode on the same terminal. The steps shown in FIG. 5 include all the sequence of events in FIG. 4, i.e., opening a special file 51, requesting an I/O bus 52, enabling the monitoring mode signals 53, sending a protocol mode 54 to put the virtual terminal in monitor mode, and requesting a screen 55. After the signal grant 12 is received by the application 50, the terminal is in monitor mode. If the application desires to put the terminal in KSR mode, the application must send the command called screen release acknowledge (SCREEN RELEASE ACK), step 56, to the virtual terminal subsystem. Step 56 causes the virtual terminal to get ready to get out of monitor mode. The application 50 must then send a protocol mode, step 57, which changes the virtual terminal from monitor mode to KSR mode.

Figure 6:
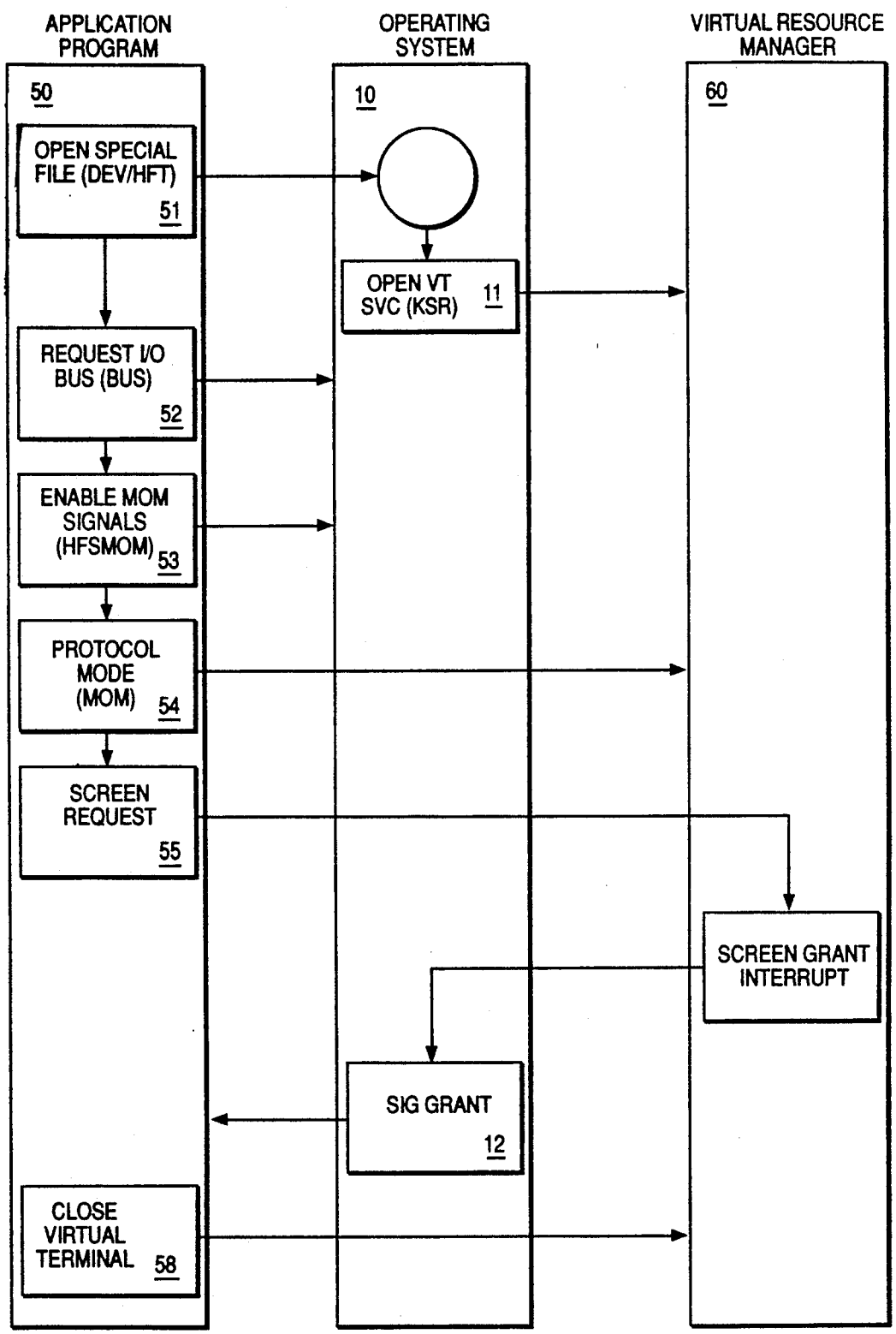
FIG. 6 is a flow chart of the sequential events when a new terminal is opened in monitor mode, and then the virtual terminal is closed.

FIG. 6 illustrates the situation where a new virtual terminal is opened in monitor mode and then the virtual terminal is closed. Again the sequence of events are the same as in FIG. 4, i.e., opening a special file 51, requesting an I/O bus 52, enabling the monitor mode signals 53, sending a protocol mode 54 to put the virtual terminal in monitor mode, requesting a screen 55, and processing a signal grant 12. After the signal grant 12, from the screen grant interrupt 13 is received by the application 50, the terminal is in monitor mode. At this point, if the application chooses to close the virtual terminal, it may do so by sending a close virtual terminal command, (CLOSE VT) step 58, to the virtual resource manager 60. This removes the virtual terminal from the virtual resource manager process and kills the virtual terminal.

A virtual terminal that is running in the monitor mode can participate in a hot key sequence of the virtual terminal subsystem. Hot keying allows different virtual terminals which are opened to be displayed on the hardware display. The ability for a multiplicity of virtual terminals to share the same hardware display is described later in this specification, Ser. No. 820,451.

The action key on the keyboard, if activated, will cause a virtual terminal screen to appear on the hardware display. If the action key is activated again, the next virtual terminal screen will be displayed. This process is repeated with each activation of the action key. Once the key has been activated enough times such that each virtual terminal screen has appeared on the hardware display, the next activation of the action key will cause the virtual terminal screen that was first displayed to be displayed again. Thus continuous scrolling of the virtual terminal screens on the hardware display can take place with repeated activations of the action key on the keyboard.

Hot keying allows the various virtual terminal screens to be accessed on the hardware display without the need to save each screen of a virtual terminal before removing it from the hardware display. The hot keying sequence restores a previous virtual terminal screen to the hardware display automatically upon the activation of the action key on the keyboard. In this way, the application does not have to save the data of each virtual terminal that is opened.

However, if a virtual terminal is running in monitor mode, and is participating in the hot key operation, it has to save its data before it relinquishes the control of the display.

Figure 7:
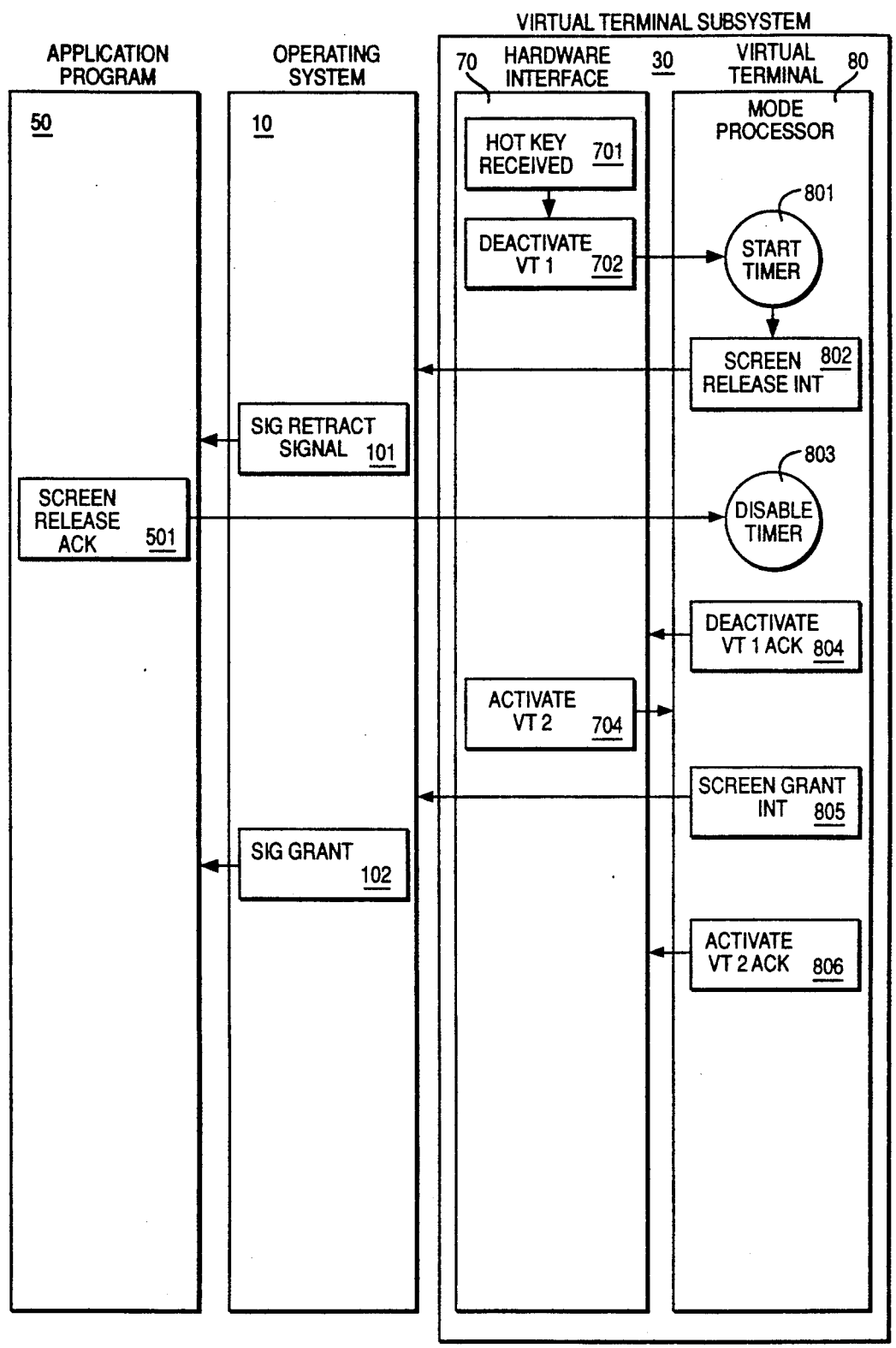
FIG. 7 is a flow chart of the sequential events during a hot keying operation between two terminals in monitor mode without a time-out condition.

FIG. 7 illustrates the case where two terminals are opened, and they are both in monitor mode. If the action key is activated on the keyboard, the virtual terminal resource manager 70, which is part of the virtual terminal subsystem 30, receives the signal 701. The virtual terminal resource manager 70 sends a signal 702 to deactivate the virtual terminal. This starts the virtual resource manager timer 801 in the virtual terminal mode processor 80 which is part of the virtual terminal subsystem 30. The timer is set for a specified period of time, such as for 30 second.

The application receives a screen release interrupt from the virtual terminal subsystem. In UNIX operating systems, the operating system 10 changes the screen release interrupt 802 to a SIGRETRACT signal 101 and sends that to the application 50. The application actually sees the SIGRETRACT signal. This tells the application that it has a specified period of time, such as 30 seconds, to save all of its data, and to respond to the SIGRETRACT signal 101. To respond to the SIGRETRACT signal 101, the application sends a screen release acknowledge 501 to the virtual terminal subsystem 30. The screen release acknowledge 501 indicates to the virtual terminal subsystem that the application has acknowledged the fact that the present display has to be released, that the application has saved the screen data, and that the application is ready to relinquish the display. Thus, the virtual resource manager timer is disabled, step 803.

At this point the virtual terminal subsystem receives the screen release acknowledge. The virtual terminal subsystem goes through a deactivate 804 and activate 704 process. This process is internal to the virtual terminal subsystem. The application has no knowledge of this process. Activating the second virtual terminal (ACTIVATE VT2) 704, which is in monitor mode, causes its data to be displayed on the hardware display. The application 50 will receive a SIGRANT signal 102 form the virtual terminal subsystem which tells the application running in the second virtual terminal, that it now has the control over the display, and it can be used for the application. As such, the ability of the first terminal to talk to the display has been taken away, and the second terminal has been given the opportunity to come onto the display to run its application.

Figure 8:
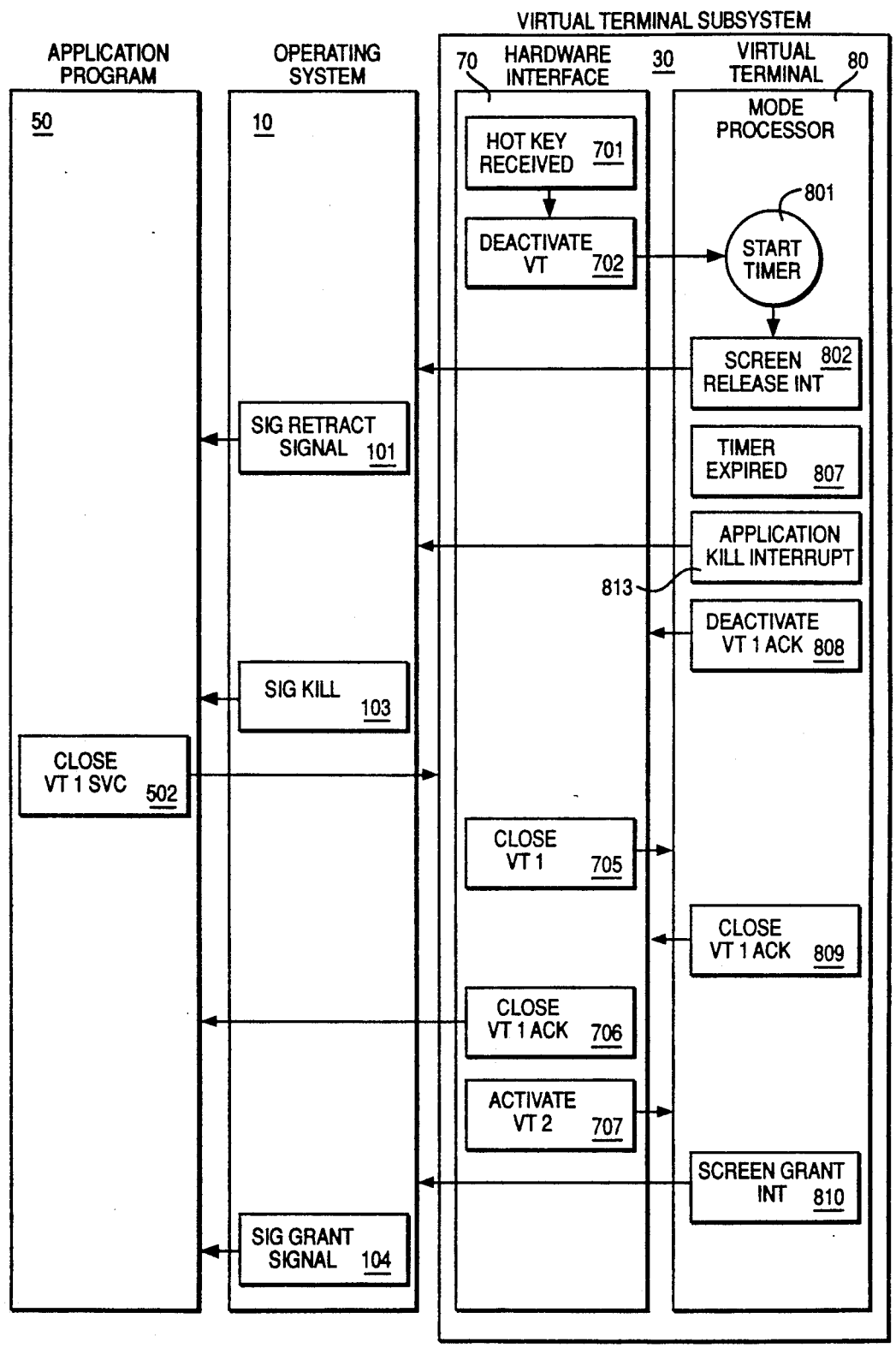
FIG. 8 is a flow chart of the sequential events during a hot keying operation between two terminals in monitor mode with a time-out condition.

FIG. 8 illustrates the situation where two terminals are in the monitor mode already, and are going to participate in the hot keying operation. However, in this situation, the application does not respond to the SIGRETRACT signal 101 within the designated amount of time. As shown in FIG. 8, the application 50 receives a SIGRETRACT signal 101 from the operating system 10 since the keyboard action key for hot keying was activated, step 701. If the application does not save its data and respond to the signal within a designated time, e.g. 30 seconds, the timer in the virtual terminal subsystem 30 will expire, step 807.

At this time, the application will receive a SIGKILL signal 103 from the virtual terminal subsystem. This tells the operating system that the virtual terminal is dead, and that the operating system should close that virtual terminal. The virtual terminal is removed from the virtual terminal subsystem. Therefore, after the SIGKILL processing 103, that terminal is closed 502. The virtual terminal subsystem will receive a close command. It closes the terminal by removing the process from the virtual terminal subsystem structures, and acknowledging the close 706 to the application 50 and the operating system 10. At this time, the first terminal is removed from the virtual terminal subsystem structures.

Since in this example, there is a second virtual terminal, the virtual terminal subsystem knows about this second terminal, and activates 707 this second virtual terminal. Since the second terminal is in monitor mode, a screen grant interrupt will be sent by the virtual terminal subsystem to the operating system, which in turn, sends a SIGGRANT signal to this terminal's application. At this time, this terminal has control of the display hardware.

Figure 9:
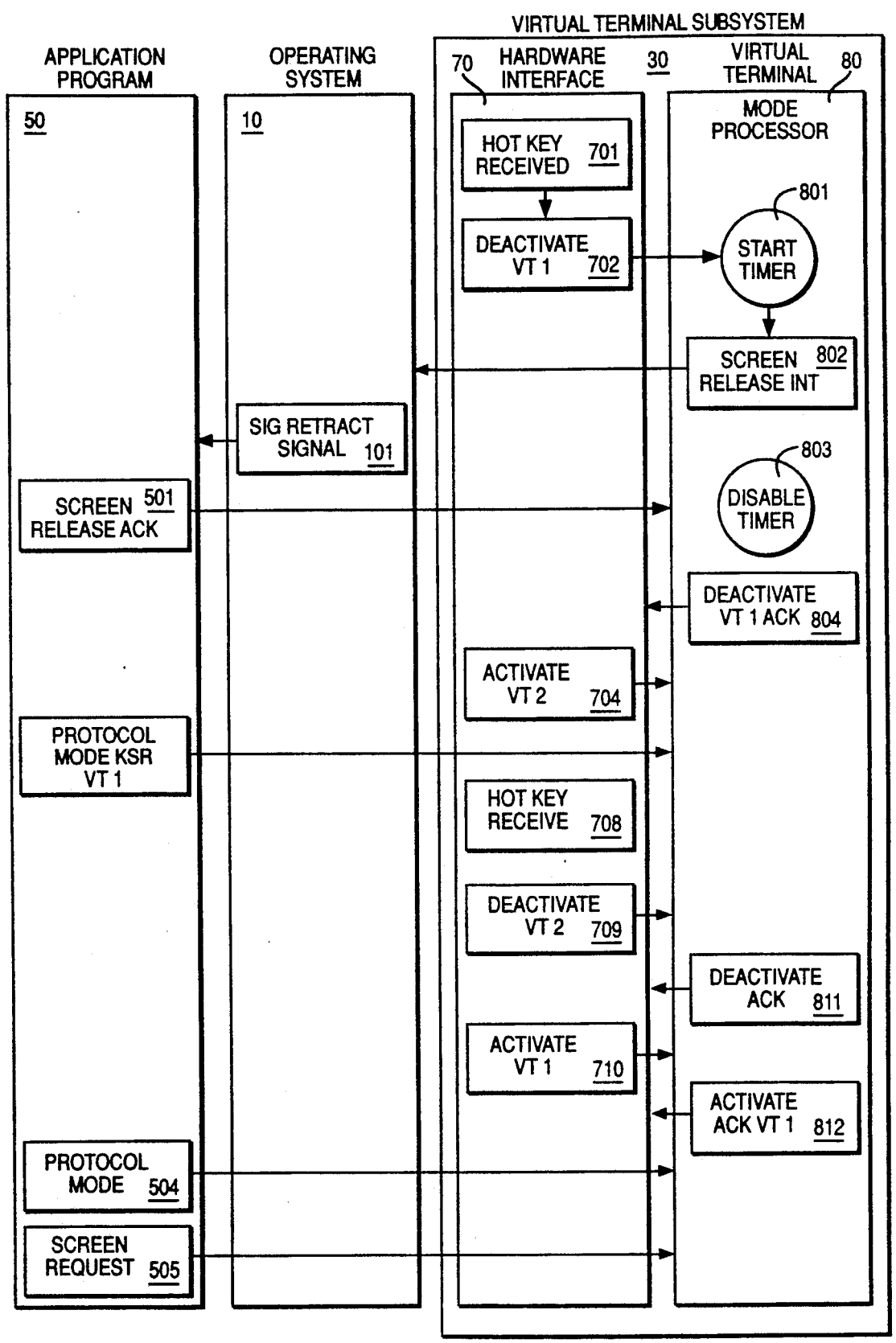
FIG. 9 is a flow chart of the sequential events when two terminals are opened in KSR and monitor mode, and then the terminal in monitor mode is changed to KSR mode while it is in the inactive state.
Figure 10:
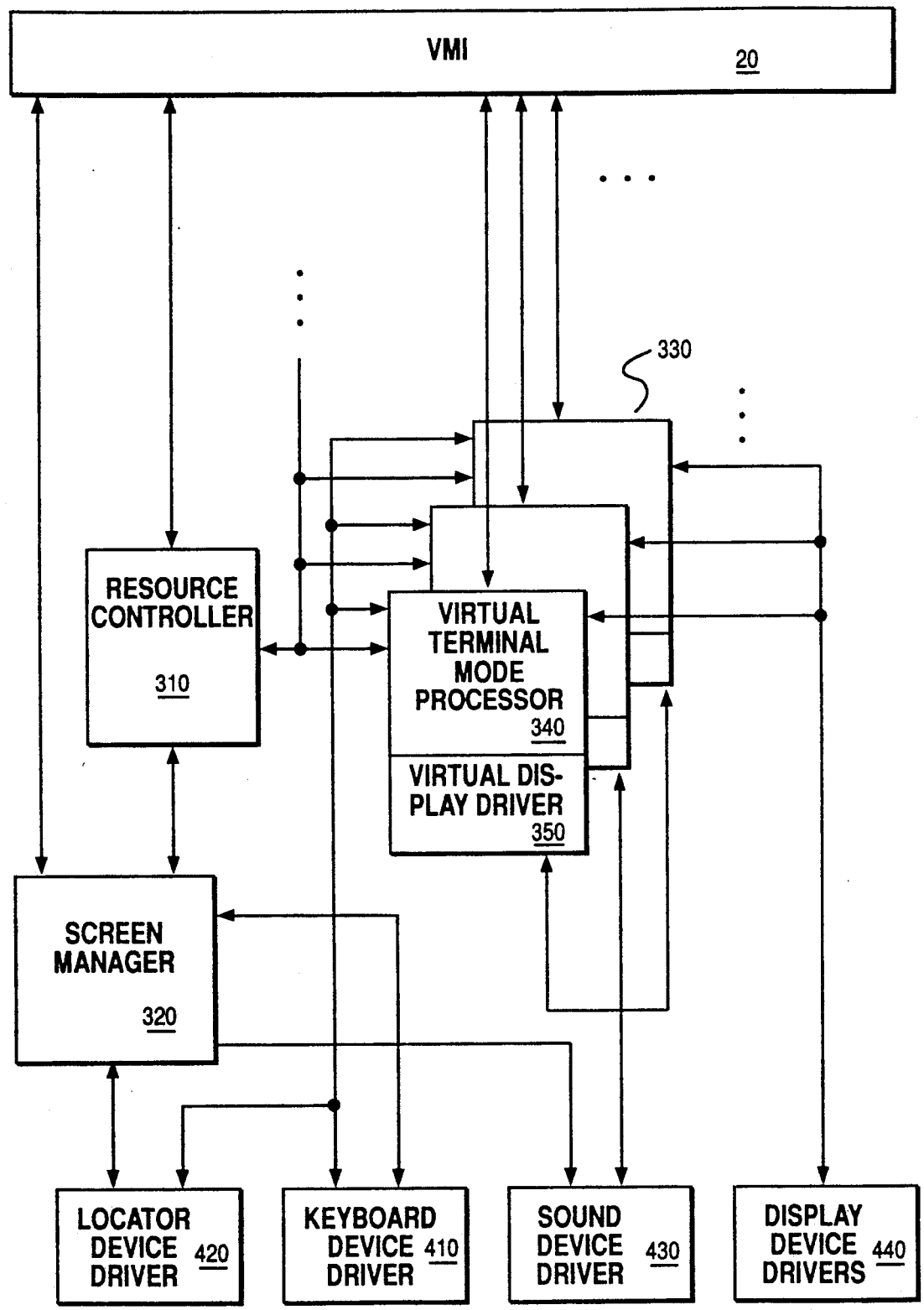
FIG. 10 is a block diagram showing the components of a virtual terminal subsystem for a plurality of virtual terminals.

FIG. 9 represents the situation where two terminals are opened in KSR and monitor mode. The terminal in monitor mode is changed to KSR while it is in the inactivate state. This terminal is reactivated, in KSR mode, and then its mode is changed to monitor mode.

In this situation, it is important that the application remembers that since the terminal was in monitor mode, and then changed to KSR mode, the virtual terminal subsystem has not retained any information for that monitor mode. Therefore, the application has to define another buffer ring and reset all of its pointers before the switch from KSR to monitor mode can be accomplished. This is true even if a previous circular buffer was defined when the terminal was first in monitor mode and then switched to KSR mode. The circular buffer disappeared when the mode was switched to KSR mode. Therefor, the situation in FIG. 9 illustrates that the protocol mode, step 504, and the screen request SVC 505 have to be sent, one after the other, in that order, every time a terminal is to be put into monitored mode.

Virtual terminals provide applications with the freedom to act as if they own the entire real terminal. Virtual terminals give devices than are physically present, that there are more input devices than are physically present, and that these devices have different characteristics than the physical devices. Also, with virtual terminals a program can be written such that it is dependent of the specifics of physical terminal devices, e.g., display buffer organizations, presence of optional input devices, etc. Additionally, virtual terminals relieve the programmer of developing individualized mechanisms for dealing with the limitations of the actual resources.

This processing system allows multiple program activity at the lowest layer of the system design as opposed to the application level. Virtualization of terminals is at the very base of the processing system. In this way, any application that is used in the system can take advantage of multiple activities regardless of the internal structure of the particular program. The program does not have to consider the implementation of virtual terminals, and does not know that it is being utilized in that fashion. Virtualization occurs at a fundamental layer of the processing system as opposed to implementing it within an application.

Virtualization occurs below the operating system at the fundamental layer called the virtual resource manager. The virtual resource manager is responsible for disk, memory and terminal virtualization.

Many different virtual machines can run on the virtual resource manager, with each virtual machine running a different operating system.

The virtual terminal model of this invention utilizes the emulation of a glass teletype, such as a keyboard send/receive (KSR) teletype, although other models could be used.

The terminal model of the preferred embodiment supports the terminal requirements for the UNIX operating system in a virtual machine environment. The UNIX operating system requires a glass teletype emulation such as the Digital Equipment Corporation VT100, or IBM 3101 which is an enhancement of the original keyboard send/receive (KSR) teletype.

The KSR terminal model is an ASCII terminal emulation in the spirit of the ANS 3.64 standard utilizing a PCASCII code set rather than the ANSI 3.4/3.41 code sets. The ANSI 3.4 data stream is extended, as specified by the standard, to support enhanced sound generation capability, to handle the flow of locator events, and to provide various controls to switch physical displays, fonts, and terminal characteristics.

Each virtual terminal embodies the characteristics of a single keyboard send/receive terminal. That is, it recognizes and processes the data stream received from the virtual machine causing the requested actions to occur. These include moving the cursor or drawing characters onto the virtual display, inserting or deleting lines, clearing the screen, or changing the attributes with which characters are rendered. In addition to these actions, the outbound data stream can cause the generation of sequence of continuous tone sounds, or cause the virtual display to be rendered on any of the available physical displays.

A virtual terminal receives input from a virtual keyboard and/or a virtual locator, and outputs to a virtual display. Thus the virtual terminal can always expect to get input from its virtual input devices and can always output to its virtual display. These virtual devices may or may not have physical devices allocated to them. Therefore, the virtual terminal may not actually get input or write to a physical display. As each virtual terminal recognizes and processes the data stream inbound from the keyboard, it can, if requested, automatically echo various characters and simple functions back to its virtual display. This behavior permits the application to run as if it were using a real KSR terminal. Thus the large body of old applications require no modification to run in this virtual terminal environment.

FIG. 2 shows the components of a virtual terminal manager within the virtual resource manager. The virtual machine interface 20 is the top level presented to all virtual machines of all support for the virtual resource manager. Below the virtual machine interface layer 20 are the components of the virtual terminal manager.

The virtual terminal manager comprises a resource controller 310, a screen manager 320, a keyboard device driver 410, a locator device driver 420, a sound device driver 430, a display device driver 440, and multiple virtual terminals 330.

The resource controller 310 initializes and terminates the subsystem. It also allows a virtual machine to query and modify the configuration and characteristics of the interactive devices, the real terminal, available to the user. Furthermore, it allocates and deallocates the system resources required for the operation of a virtual terminal as it is opened and closed, i.e., created or destroyed.

The screen manager 320 performs the allocation of physical devices to the virtual devices used by the virtual terminals. The screen manager, in conjunction with the keyboard and locator device drivers, implements the time and space sharing required to virtualize these input devices. In a similar manner, the screen manager, in cooperation with the virtual display driver, implements the time sharing required to virtualize a display. At any time the display is allocated to one and only one of the virtual displays used by the virtual terminals.

The screen manager allocates all the physical devices en masse to the virtual devices of the active virtual terminal. The active virtual terminal is the terminal with which the user may interact. The active virtual terminal can actually get input and produce output on a display.

The screen manager also provides for reallocation of the physical resources. The impetus for reallocation results from either user requests or application requests. User requests are through the logical keyboard, or a similar logical mouse, allocated to the screen manager. It involves deallocating the resources from the currently active virtual terminal and the allocation to the newly active virtual terminal. This allocation requires the cooperation of both virtual terminals involved. As mentioned above, the participation of the device drivers ensures synchronization of events such as keystrokes and work request acknowledgements.

Another component of the virtual terminal manager subsystem is the keyboard device driver 410. The keyboard device driver routes input events from the real keyboard to virtual terminals based on instructions from the screen manager.

Optional components of the virtual terminal manager subsystem are the locator device driver 420, and the sound device driver 430. The locator device driver routes input events from the real locator to virtual terminals based on instructions from the screen manager. The sound device driver provides sound for the subsystem.

Also, there are from one to four display device drivers 440 which service interrupts from the display adaptors.

The virtual terminal manager subsystem comprises from one to 32 virtual terminals. Each virtual terminal has an instance of the virtual terminal mode processor 340. The virtual terminal mode processor provides the KSR-like behavior of the virtual terminal. Each virtual terminal also has an instance of the virtual display driver 350. The virtual display driver 350 is the target of all virtual terminal mode processor outputs to the display, and virtualizes the display. Each virtual terminal also has a common device utility by which the virtual terminal mode processor communicates its resource requests to the resource controller.

VIRTUAL TERMINAL SUBSYSTEM INITIALIZATION

Initialization of the virtual terminal subsystem is performed by the resource controller. First, the resource controller must receive a list containing the real devices (displays, keyboard, etc.) identifiers for the various other subsystem components, fonts, and the virtual terminal defaults. Initialization requires: 1) checking the above initialization information for completeness and correctness, 2) initializing the real input devices, 3) processing the supplied fonts, 4) creating the screen manager, 5) creating the paths necessary for communication with the screen manager, 6) attaching the input devices to the screen manager, 7) attaching the screen manager to the virtual resource program check handler, and 8) initializing the global data structure shared between some components.

The resource controller initializes the subsystem in the following manner. The following routine is in program design language from which source and machine code are derivable.

```
INITIALIZE GLOBAL DATA STRUCTURE
IF THE INITIALIZATION INFORMATION NOT
    COMPLETE AND CORRECT
THEN
    PRESENT ERROR INDICATION
ELSE
    CALL INIT_DEVICES
    CALL CREATE_SM
    PRESENT SUCCESS INDICATION
    PREPARE TO SERVICE RESOURCE COMMANDS
        FROM THE OPERATING SYSTEM
```

The routine INIT_DEVICES initializes the various device drivers in the system and places the requisite information in the global data structure for use by various components. It also derives the information necessary for the system use of the fonts identified in the initialization parameter. The routine also creates communication paths from the devices to the resource controller (RC).

The routine CREATE_SM creates the screen manager (SM) process and communication paths from it to the resource controller (RC), keyboard and locator device drivers, and the operating system.

VIRTUAL TERMINAL OPEN

After initialization, the resource controller is ready to accept resource requests. When a request is received from an operating system to open (create) a virtual terminal, the resource controller takes the following steps: 1) creates the process for the virtual terminal, 2) performs the necessary functions (copy, bind) on the virtual terminal mode processor to establish a functioning process, 3) establishes communication paths to/from the virtual terminal mode processor and from/to the device drivers present, 4) assigns an external identifier to the virtual terminal, 5) attaches the virtual machine to the virtual terminal, and 6) initializes the virtual terminal process, passing the requisite information in the process initialization parameter.

The resource controller opens a virtual terminal as indicated above by the following routine:

```
IF MAXIMUM NUMBER OF VIRTUAL TERMINALS OPEN
THEN
    INDICATE NO SUCCESS
ELSE
    CREATE_VT
    CREATE_PATHS
    INITIALIZE THE VIRTUAL TERMINAL (see below)
    TELL_SM (OPEN)
    INDICATE_SUCCESS
```

The routine CREATE_VT copies the code for the virtual terminal mode processor (VTMP). This permits each virtual terminal to have its own data and stack space. The routine then creates a process for the virtual terminal. It also creates names for internal and external (operating system) identification of the virtual terminal.

The routine CREATE_PATHS establishes communication paths to/from the virtual terminal from/to the device drivers present and the operating system that requested the open. It also establishes communication paths from the screen manager (SM) to the virtual terminal. Both CREATE_VT and CREATE_PATHS save information in the global data structure.

The routine TELL_SM tells the screen manager (SM) that a new virtual terminal is opened. It sends the name of the new virtual terminal (and index into the global data structure) so the screen manager (SM) can derive needed information. The screen manager (SM) proceeds to make the virtual terminal active (see below). The routine TELL_SM waits for the screen manager (SM) to finish before allowing the resource controller (RC) to continue.

The routine INDICATE_SUCCESS returns the external identifier for the virtual terminal and a communication path from the operating system to the virtual terminal to the operating system.

The virtual terminal mode processor (VTMP) must finish the initialization of the virtual terminal. After the virtual terminal is initialized, the virtual terminal mode processor performs the following routine:
    QUERY_DEVICES
    SELECT_DISPLAY
    SELECT_INPUT The routine QUERY_DEVICES returns the identifiers for the available devices. The routine SELECT_DISPLAY allows the virtual terminal mode processor (VTMP) to choose which of the available displays to use. The SELECT_DISPLAY function copies the virtual display driver for the chosen display and binds the copy to the virtual terminal mode processor. This allows the virtual terminal to use its virtual display independently of other virtual terminals. The virtual terminal may begin to interact with the user when it becomes active.

The routine SELECT_INPUT allows the virtual terminal mode processor (VTMP) to choose to receive or not receive input events from the keyboard and/or locator.

At this point, the operating system is able to communicate with the virtual terminal. The operating system also is able to issue screen management commands concerning the virtual terminal, if attached to the screen manager.

VIRTUAL TERMINAL CLOSE

To close a virtual terminal that has been opened by the above stated steps, either the operating system or the virtual terminal may issue a close request.

The resource controller (RC) receives the command and performs the following actions:
    TELL_SM (CLOSE)
    RECOVER_RESOURCES
    INDICATE_COMPLETION The routine TELL_SM sends a command to the screen manager (SM) identifying the virtual terminal to close, via the internal identifier. It waits for the screen manager (SM) to complete its duties (see below). The routine RECOVER_RESOURCES recovers all resources (storage, control blocks, etc.) used by the closed virtual terminal and removes the virtual terminal from the global data structure. The routine INDICATE_COMPLETION notifies the operating system (if it is the requestor) of completion; a virtual terminal cannot be notified because it no longer exists.

The screen manager (SM) performs the following actions while the resource controller (RC) waits:
    COMMAND_MP(CLOSE)
    NEW_VT_ACTIVE
    ACK_RC The routine COMMAND_MP sends a CLOSE command to the virtual terminal via the communication path between them, and waits for the virtual terminal (VTMP) to respond. The routine NEW_VT_ACTIVE makes another virtual terminal active, that is, allocates the real input and output devices to that virtual terminal (see below). The routine ACK_RC communicates with the RC which allows the RC to continue its close processing.

The virtual terminal mode processor (VTMP) receives the CLOSE command and performs the following actions:
    RELEASE_DISPLAY
    ACK_SM
    TERMINATE The RELEASE_DISPLAY routine indicates to the virtual display driver (VDD) that it can release its resources. The ACK_SM routine allows the screen manager (SM) to continue its close processing. TERMINATE is not a routine; the virtual terminal mode processing (VTMP) terminates the virtual terminal process by returning.

VIRTUAL TERMINAL ACTIVATION/DEACTIVATION

The act of making a virtual terminal active may happen because of an open or close, or because the user has requested that another virtual terminal be made active. It requires the cooperation of the screen manager, (SM), the virtual terminal mode processor (VTMP) (or equivalent) for the currently active virtual terminal, the virtual terminal mode processor (VTMP) for the next active virtual terminal, and the input device drivers. The screen manager (SM) performs the following actions:

FIND_VT
COMMAND_KDD(NEW_VT)
COMMAND_LDD(NEW_VT)
COMMAND_VT(DEACTIVATE)
COMMAND_VT(ACTIVATE)
UPDATE_DATA(NEW_VT)

The routine FIND_VT determines what virtual terminal should be made active. The result depends on the rules for screen management and the actual command received.

The routine COMMAND_KDD sends a command to the keyboard device driver (KDD) identifying the virtual terminal to receive input from the keyboard. The routine COMMAND_LDD sends a command to the locator device driver (LDD) identifying the virtual terminal to receive input from the locator. These routines wait for the device drivers to complete their actions before returning. The device drivers perform identical actions (see below).

The routine COMMAND_VT with the deactivate option causes the currently active virtual terminal to perform whatever actions are necessary (see below). The routine COMMAND_VT with the active option causes the newly active virtual terminal to perform whatever actions are necessary (see below).

The routine UPDATE_DATA manipulates the screen manager's (SM's) internal structures so that it knows what virtual terminal is active.

The keyboard device driver (KDD) and/or the locator device driver (LDD) perform the following:

SET_NEW_PATH_MODES
SEND_STATUS
ACK_SM

The routine SET_NEW_PATH_MODES place the identifier for the communication path to the newly active virtual terminal into an internal structure. It also sets up the correct operating mode of the device for the virtual terminal.

The routine SEND_STATUS informs the virtual terminal about the current device status, i.e., what relevant keys (or buttons) are already pressed when the virtual terminal becomes active.

The routine ACK_SM allows the screen manager (SM) to continue its processing in a synchronized fashion.

The virtual terminal mode processor (VTMP) of the virtual terminal becoming inactive performs the following:

DEACTIVATE_VDD
NO_SOUND

The routine DEACTIVATE_VDD tells the virtual display driver (VDD) for the virtual terminal that it cannot write to the display, but must buffer output from the virtual terminal. The routine NO_SOUND sets internal flags for the virtual terminal mode processor (VTMP) so that it does not send operating system requests for sound to the sound device driver (SDD).

The virtual terminal mode processor (VTMP) of the virtual terminal becoming active performs the following:

ACTIVATE_VDD
SOUND_OK

The routine ACTIVATE_VDD tells the virtual display driver (VDD) for the virtual terminal that it can write to the display; however, the virtual display driver (VDD) first sends the buffer it maintained to the display. Thus the user sees the most current information available from the application. The routine SOUND_OK sets internal flags for the virtual terminal mode processor (VTMP) so that it sends operating system requests for sound to the sound device driver (SDD).

At this point, the user is able to interact with the newly active virtual terminal.

DESCRIPTION OF OPERATION

The virtual terminal takes input from the virtual machine in the form of output that would have been directed to the real display terminal. It virtualizes it into its instance. If the virtual terminal is the active terminal, i.e., the terminal the user is currently interacting with, then the terminal has as much real resource as it requires. It gets all of the input from the locator device driver and the keyboard device driver. Therefore the inputs from that driver will be routed to that instance of that terminal. Any sound that it generates will go to the sound device driver, and any display that it generates will be passed to a display driver, and will be presented to the user on the actual screen of the display device.

Other instances of virtual terminals that may be opened but not currently active could be getting output from a virtual machine. When they are getting this output the virtual machine interface level appears exactly the same to their virtual machine, whether they are active or inactive. Therefore, when an inactive virtual terminal gets an output request to display, instead of sending that request to a device driver, it will be virtualizing that into a device driver buffer.

This buffer is a piece of storage (RAM) to hold the current state of the display. At any instant, the virtual presentation space buffer of a virtual terminal contains the accumulated front of screen representation of all output requests sent to the virtual terminal. If the terminal gets activated by the user, the contents of the virtual device buffer will be displayed on the actual display screen.

At the time that a particular virtual terminal is given real physical display resources, it must convert the accumulated data in the virtual presentation space to real display device commands. This results in the user being able to see the current snapshot of information. In other words, when a virtual terminal is forced to relinquish its real display resources, it is conceptually similar to the user turning his head away from a real terminal for a period of time. When he turns his head back to look at it, he sees the total accumulated display modification to that point in time.

It is important that the presentation space buffer be updated even when no real devices are allocated to it. These virtualized presentation buffers are maintained in device dependent form in the display device driver component of the virtual terminal management subsystem.

The screen manager interacts with a user in the following fashion. A ring of terminals exists such that each time a virtual terminal is opened it is placed into this ring. At the time a user wants to interact with a particular terminal, and therefore a particular application, the user can hit a certain key sequence on the keyboard. This key sequence is transmitted to the screen manager by the keyboard device driver. The screen manager determines by checking the ring structure, which of the terminals currently available to the user should be made active. In this manner a user can decide which activity or which application he selects to interact with at any given time.

The activities involved in changing the activity state of a terminal involve the screen manager, the device drivers and the virtual terminals. The sequence of events is as follows. At the time the screen manager is notified that a new terminal is supposed to be made active, it sends the new routing information to an input device driver. The keyboard or locator device driver receives this information and decides that it then needs to change the routing such that input events go to the newly active virtual terminal.

Such is the case for the input devices. The output devices are handled in a slightly different fashion. The virtual terminal is notified by the screen manager that it is to become inactive. The virtual terminal itself is responsible, in the case of the sound device driver, for deciding that it can no longer send sound requests to the sound device driver to produce sound audible to the user.

For the virtual display driver there is a different mechanism. In this case, the virtual display driver is evidenced to the virtual terminal as a series of routines that can be called by the virtual terminal to produce output on the display. At the time a terminal is made inactive, it calls a routine of the virtual display driver that indicates that the terminal is inactive. In this case, when a virtual machine tries to output to a display through its virtual terminal, the virtual display driver places any information that it would send to the device in the virtual presentation space, instead. This allows the application that is using the virtual terminal to communicate with the virtual terminal as if it were still active. The terminal that is becoming active calls a routine of the virtual display driver that indicates that the terminal is active. The virtual terminal is now able to use its virtual display driver in the same manner as it would when it was inactive, but its virtual display driver is now free to actually write to the display adapter.

As a result an application using a virtual terminal, does not need to know whether it is the active or inactive virtual terminal. It can communicate with its virtual terminal at any time. Any updates it does to its display are made visible when its virtual terminal becomes active again. The application is totally unaware that its virtual terminal is inactive.

We claim:

1. A data processing system having at least one display device for displaying output from an application running on said data processing system, said system comprising:
    means for selecting, by said application, between a first mode and a second mode for routing output from said application to said display device;
    means for routing at least one command to display from said application through an operating system to said display device during said selected first mode for displaying output from said application;
    means for routing, during said selected second mode, display data from the application directly to the display device, thereby enabling data to be transferred from said application to said display device with a single operation; and
    a buffer, included within said means for routing, for storing input data from an at least one input device, wherein said application accesses said buffer and outputs said input data directly to said at least one display device.

2. A data processing system as in claim 1 further comprising at least one virtual terminal sharing the at last one display device.

3. A data processing system as in claim 1 wherein text output from said application is displayed in said selected first mode and graphic output from said application is displayed in said selected second mode.

4. The system of claim 2 further comprising means for opening, by said application, the at least one virtual terminal for running said application on said virtual terminal in said first mode; and means for changing, by said application, said first mode to said second mode.

5. The system of claim 4 further comprising means for opening, by said application, a second virtual terminal in said second mode.

6. The system of claim 2 further comprising means for opening, by said application, the at least one virtual terminal for running said application on said virtual terminal in said second mode; and means for changing, by said application, said second mode to said first mode.

7. The system of claim 2 further comprising means for opening, by said application, a first virtual terminal in said first mode; means for opening a second virtual terminal in said second mode; and means for activating, upon a selected input from a user, one of said virtual terminals for displaying on the display device the output from the application in the mode of said activated virtual terminal.

8. The system of claim 2 further comprising means for opening, by said application, the virtual terminal in said first mode; means for changing, by said application, said virtual terminal to said second mode when said virtual terminal is deactivated; and means for changing, by said application, said virtual terminal to said first mode when said virtual terminal is activated.

9. The system of claim 1 further comprising means for changing, by said application, between said first mode and said second mode while said application is running on said processing system.

10. A method of directing data to at least one display device from an application running on a processing system, said method comprising:
    selecting, by said application, between a first mode and a second mode for defining a path for data from an input device to said display device;
    receiving data from said input device into a storage area managed by said application during said selected second modes;
    sending, by the application in said selected second mode, the received data from the storage area directly to the display device, thereby enabling data to be transferred from said application to said display device with a single operation; and
    directing data from said input device to said operating system for access by said application in determining a corresponding output to said display from a command to display generated by said operating system, in said selected first mode.

11. The method of claim 10 further comprising the step of changing, by said application, between said first mode and said second mode while said application is running on said processing system.

12. A processing system having at least one input device, at least one display device, and an operating system for running an application on said processing system; said processing system comprising:
   means for running said application on said processing system in a first mode and a second mode;
   means for directing data from said input device to said operating system for access by said application and determining, by said operating system a corresponding output of said data to said display device, in said first mode;
   means for depositing data from said input device into a buffer accessible by said application in said second mode; and
   means for sending the data, by said application, from the buffer directly to the display device, in said second mode, thereby enabling data to be transferred from said application to said display device with a single operation.

13. A data processing system comprising:
   means, within an operating system of the data processing system, for vitualizing a plurality of physical resources of the data processing system by opening at least one virtual terminal for each of at least one application running on said data processing system;
   means, within the operating system, for allocating and deallocating at least one of said physical resources of the data processing system to one of said applications having the opened virtual terminal;
   means, within the operating system of the data processing system, for managing a use of the at least one physical resource allocated to said application;
   means for defining, by the application, a buffer in a memory space of the operating system for receiving input data from an allocated input physical resource through the means for managing; and
   means for disabling said means for managing and enabling at least one of the applications to interact directly with the at least one allocated output physical resource such that said input data stored in said buffer transferred from the enabled application to said allocated output physical resource with a single operation.

14. The system of claim 13 further comprising means for removing, by the application, the input data from the buffer at any time, independently from the means for managing in the operating system, when the application is enabled to interact directly with an allocated output display resource.

15. The system of claim 14 wherein the means for removing further comprises the means for sending, by the application, the input data from the buffer directly to the output display resource independently from the means for managing.

16. The system of claim 13 wherein the means for allocating and deallocating further comprises means for receiving input data from a user for deallocating a physical output resource from said at least one application, and allocating said physical output resource to a second one of said applications having a different opened virtual terminal, thereby displaying a virtual screen of said different opened virtual terminal on said physical output resource.

17. The system of claim 16 wherein said at least one application and said second one of said applications are enabled to interact directly with said physical output resource.

18. The system of claim 17 further comprising means for saving, by the at least one application, any data of the at least one application before the virtual screen of said different opened virtual terminal is displayed on said physical output resource.

19. The system of claim 13 further comprising means for relinquishing direct control of the physical resource by the at least one application in response to a signal from said second means for allocating and deallocating, thereby deallocating the physical resource from said at least one application and allocating the physical resource to a different one of said applications having a different opened virtual terminal.

20. The system of claim 13 further comprising means for disabling a direct control of the physical resource by the at least one application and enabling said means for managing, thereby returning control of the use of the physical resources to said means for managing.

21. The system of claim 13 wherein the means for disabling said means for managing and enabling the at least one of the applications further comprises means for sending, by the application, a command to the means for virtualizing for opening a virtual terminal for said application; means for accessing, by the application, an I/O bus of the data processing system; second means for enabling, by the application, at least one signal received from the means for managing; means for sending a command, from the application to the means for managing, to allow the application to interact directly with the physical resource; and means for receiving the at least one signal from the means for managing indicating that the application has direct control of the physical resources, independently from said means for managing.

* * * * *

UNITED STATES PATENT AND TRADEMARK OFFICE
CERTIFICATE OF CORRECTION

PATENT NO.   : 5,029,077
DATED        : July 2, 1991
INVENTOR(S)  : Farhad H. Fatahalian, Larry A. Halliday and Khoa D. Nguyen It is certified that error appears in the above-identified patent and that said Letters Patent is hereby corrected as shown below:

Col. 16, line 15, please delete "last" and substitute therefor --least--

Col. 16, line 60, please delete "modes" and substitute therefor --mode--

Signed and Sealed this

Second Day of February, 1993

Attest:

STEPHEN G. KUNIN

*Attesting Officer*  *Acting Commissioner of Patents and Trademarks*